United States Patent [19]

Huang et al.

[11] Patent Number: 4,601,254
[45] Date of Patent: Jul. 22, 1986

[54] TIRE PRESSURE WARNING DEVICE

[76] Inventors: Chung-Siung Huang; Hsien-Ching Kuo, P.O. Box 87-462, both of, Taipei, Taiwan

[21] Appl. No.: 478,321

[22] Filed: Mar. 24, 1983

[51] Int. Cl.⁴ ............................................. B60C 23/04
[52] U.S. Cl. ................................... 116/34 R; 116/70; 116/266
[58] Field of Search .................. 116/34 R, 70, 266

[56] References Cited

U.S. PATENT DOCUMENTS

| | | | |
|---|---|---|---|
| 3,071,973 | 1/1963 | Helfand | 116/266 |
| 3,279,418 | 10/1966 | Nilsson | 116/266 |
| 4,024,829 | 5/1977 | Su | 116/34 R |
| 4,155,325 | 5/1979 | Yu | 116/34 R |
| 4,174,673 | 11/1979 | Tung | 116/34 R |

Primary Examiner—Charles Frankfort
Assistant Examiner—Denis E. Corr
Attorney, Agent, or Firm—Reising, Ethington, Barnard, Perry & Milton

[57] ABSTRACT

A tire pressure warning device is disclosed which produces an explosive report when the tire pressure falls below a predetermined value. The device includes a connector member which screws onto the valve stem of a tire and admits pressurized air from the tire to a pressure sensing valve. A cap member screws onto the connector member and includes an actuating plunger which is biased by a coil spring toward engagement with a valve actuator in the connector member. The cap member has an outlet passage which is closed by an elastomeric balloon. A closure valve which is normally open is adapted to close the outlet passage. When the tire pressure falls below a predetermined value, the pressure sensing valve is opened and pressurized air from the tire is admitted through the closure valve to the balloon and the balloon is inflated until it explodes. The outrush of air following explosion of the balloon causes the closure valve to close and prevent further loss of air from the tire. The pressure sensing valve comprises an actuator and a valve element, with a coupling member for opening the valve element when the pressure decreases from a threshold value to a predetermined value.

7 Claims, 3 Drawing Figures

TIRE PRESSURE WARNING DEVICE

FIELD OF THE INVENTION

This invention relates to pressure warning devices especially for vehicle tires; more particularly, it relates to devices which are adapted to be mounted on the valve stem of a vehicle tire and to produce an audible warning upon occurrence of low tire pressure.

BACKGROUND OF THE INVENTION

A need exists for a reliable low cost device for warning a vehicle driver, during vehicle operation, of loss of air pressure in any of the vehicle tires. Such a warning device would serve not only the purpose of safe vehicle operation but also it would reduce damage to the vehicle tires which results from running at low pressure. Heretofore, many devices have been proposed for this purpose but they have the disadvantages of being unreliable, too costly or too complicated.

In the prior art, it is known to provide a device on the valve stem of a tire for the purpose of warning the driver by an explosive report that the tire pressure is below a predetermined value. In general, such devices comprise a housing which is adapted to be screwed onto the filler valve stem of a tire and which contains a pressure sensing valve. A discharge passage in the housing is closed by an inflatable balloon and a closure valve is disposed in the discharge passage. So long as the tire pressure is at or above a predetermined value, the sensing valve remains closed. When the tire pressure drops below the predetermined value, the sensing valve is opened and the pressurized air from the tire is admitted to the balloon and it is inflated until it explodes. Upon explosion of the balloon, a rush of air through the discharge passage causes the closure valve to be closed to prevent further loss of tire pressure. Devices of this type are described in the Su Pat. No. 4,024,829 and the Yu Pat. No. 4,155,325. Similar devices are described in the Downs Pat. No. 1,236,411 and the Caldwell Pat. No. 1,671,852.

A general objective of this invention is to provide an improved tire pressure warning device which overcomes the disadvantages of the prior art.

SUMMARY OF THE INVENTION

This invention provides a tire pressure warning device which operates with great reliability and accuracy under all operating conditions. Moreover, it is of low cost construction and of a design which facilitates economical manufacture.

In accordance with this invention, a tire pressure warning device comprises a pressure sensing valve which admits air to an alarm device only when the tire pressure has decreased to a predetermined value. When the predetermined value is reached, the alarm device, preferably an explodable balloon, is inflated instantly and exploded by the pressurized tire air. A closure valve is closed in response to the outrush of air from the exploding balloon and prevents further loss of tire pressure.

Further, according to this invention, a pressure sensing valve is provided which opens at a predetermined value of pressure regardless of whether the pressure is lost by slow or fast leaking of air from the tire. This is accomplished by a sensing valve which is opened when the pressure decreases from a threshhold value to a predetermined value. The sensing valve comprises actuating means and a valve element with a coupling means coacting with the actuating means. Preferably, the valve element includes an annular rim with a distendable diaphragm thereon serving as the coupling means.

Further, in accordance with this invention, a closure valve is provided which is closed in response to the outrush of air after the balloon explodes. This is accomplished by a closure valve including a valve seat and a piston with an annular flange adapted to engage the valve seat. The valve seat comprises an annular member and a set of spokes thereon terminating at a central opening. The piston is aligned with the central opening and rests against the spokes which hold the valve open. When the balloon explodes, the piston is forced by the outrush of air to penetrate the spokes and the annular flange engages the valve seat to close the valve.

A more complete understanding of this invention may be obtained from the detailed description that follows taken with the accompanying drawings.

DESCRIPTION OF THE DRAWINGS

FIG. 3 is an exploded view of the tire pressure warning device.

BEST MODE FOR CARRYING OUT THE INVENTION

Figure 1:
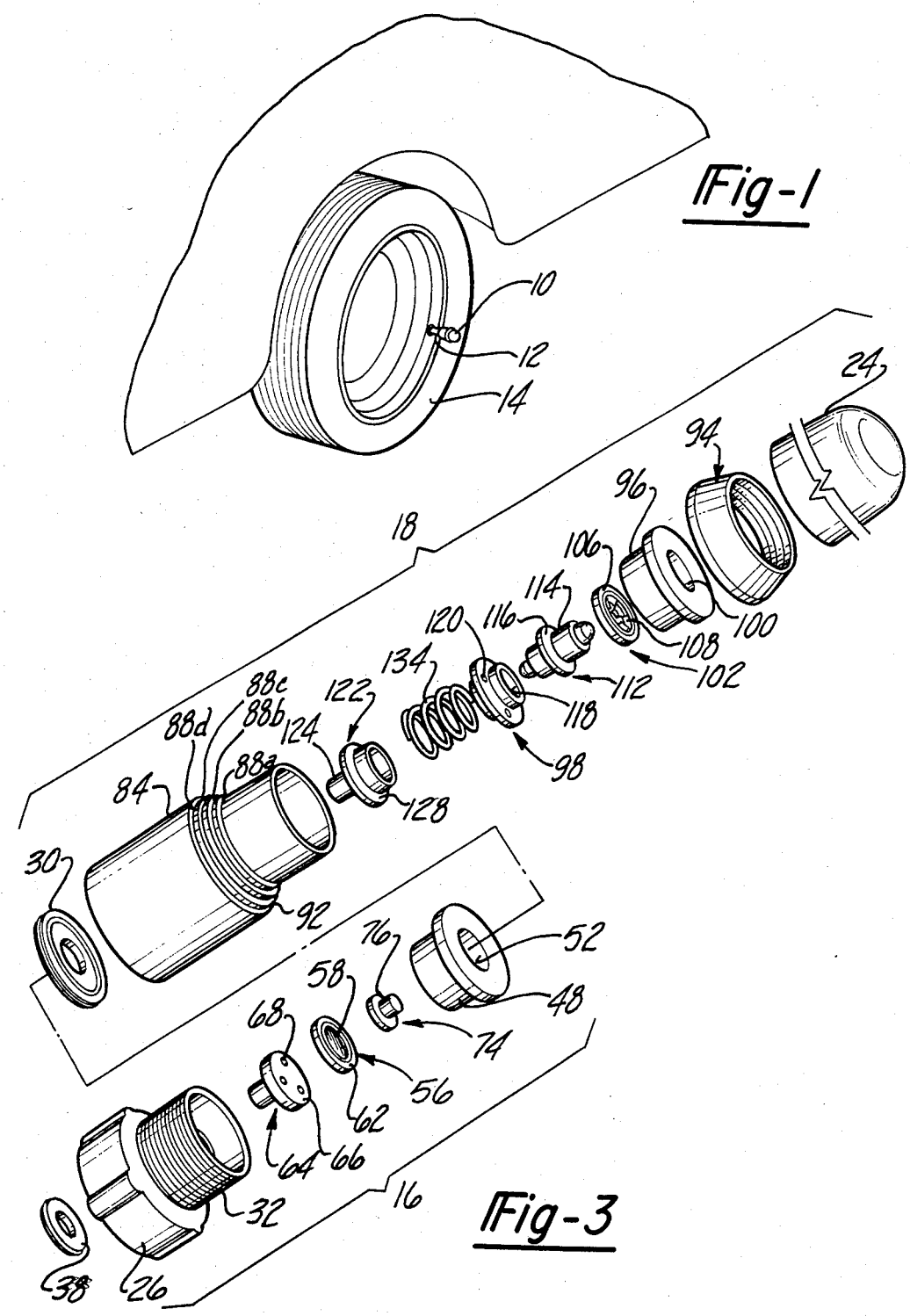
FIG. 1 shows the tire pressure warning device of this invention installed on a vehicle wheel.

Referring now to the drawings, there is shown an illustrative embodiment of the invention in a tire pressure warning device for vehicle tires. The device may be adapted for use on passenger car tires or on truck tires. The device produces a warning signal, preferably an audible explosive report, when the tire pressure falls below a predetermined value. It will be appreciated, as the description proceeds, that the invention may be embodied in different forms and may be useful in other applications.

As shown in FIG. 1, the tire pressure warning device 10 of this invention is installed on the valve stem 12 of the tire 14 of a vehicle wheel. It will be understood that a separate warning device 10 is installed on each of the vehicle wheels and remains in place during vehicle operation.

Figure 2:
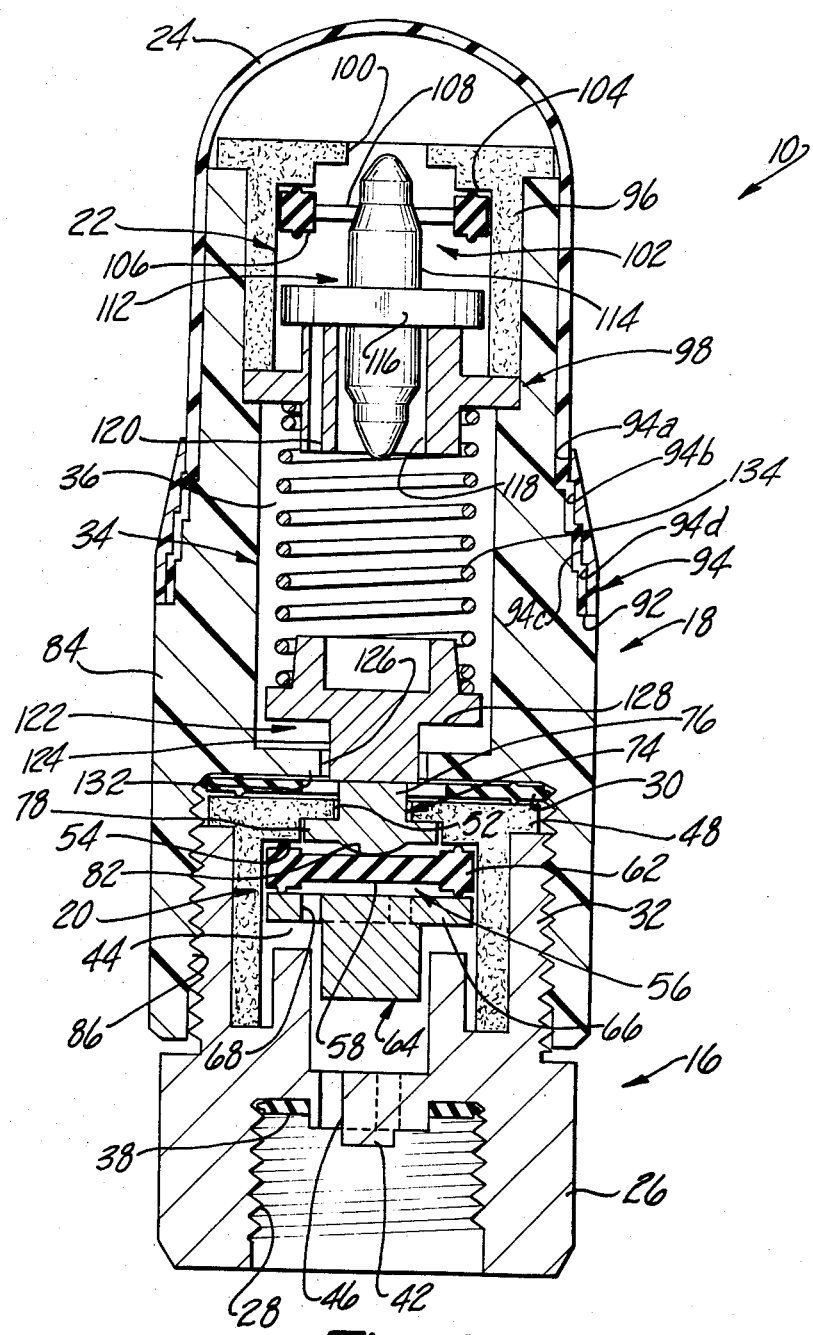
FIG. 2 is a sectional view of the tire pressure warning device.

Referring now to FIGS. 2 and 3, the pressure warning device 10 comprises, in general, a connector member 16 which is adapted to be screwed on the valve stem 12 and a cap member 18 which is adapted to be screwed onto the connector member 16. The connector member 16 contains a pressure warning sensing valve 20. The cap member 18 contains a closure valve 22 and it supports a warning signal element or alarm in the form of an elastomeric balloon 24.

The connector member 16 comprises a plastic body 26, generally of circular cross-section, having an internally threaded bore 28 adapted to be screwed onto the stem of the tire valve. The body 26 has a threaded sleeve 32. A gasket 38 is seated against the end of the threaded bore 28 for providing an air tight seal when the connector is threaded onto the valve stem. The connector member 16 includes a valve opener 42 which is adapted to depress the tire valve and open it when the connector member is screwed onto the valve stem. The pressure sensing valve 20 is disposed within a valve chamber 44 which communicates through an inlet passage, including a set of three ports 46, with the internally threaded bore 28. Thus, when the connector member 16 is screwed onto the valve stem, the tire valve is opened and pressurized air from the tire is admitted through the inlet passage to the valve chamber 44. The pressure sensing valve 20, as will become apparent, is operative to block the escape of pressurized air from the tire when the connector member is screwed onto the stem.

The pressure sensing valve 20 comprises a valve body 48 having the shape of an inverted-cup. The valve body, preferably constructed of plastic, fits within the sleeve 32 and is bonded thereto, as by ultrasonic welding, to provide an air tight seal. The valve body 48 defines a central outlet port 52 communicating with the valve chamber 44. An annular valve seat 54 on the end wall of the valve body surrounds the outlet port 52. A movable valve element 56 comprises a diaphragm 58 surrounded by an annular rim 62 which is adapted to engage the valve seat 54. A piston 64 is provided with an annular flange 66 which is adapted to engage the rim 62 of the valve element. A set of openings 68 extend axially through the annular flange 66. A valve actuator 74 extends through the outlet port 52 and is retained by the valve body 48. The valve actuator 74 comprises a stem 76 extending through the port 52, an annular flange 78 for retaining the actuator in the valve body, and an arcuate dome 82 for engaging the diaphragm.

It will be understood that the connector member 16 constitutes a subassembly of the tire pressure warning device and is separately installed onto the valve stem of the vehicle tire. When the connector body 16 is screwed onto the valve stem, the end of the valve stem seats on the gasket 38 and forms an air tight seal therewith. The valve opener 42 opens the tire valve and pressurized air is admitted through the ports 46 to the valve chamber 44. The pressurized air causes the valve element 56 to be seated with the annular rim 62 in air tight engagement with the annular valve seat 54. Thus, the pressure sensing valve 20 is closed and prevents the escape of pressurized air from the tire.

The cap member 18 comprises a sleeve 84, preferably of plastic with an internally threaded end 86 adapted to engage the threaded sleeve 32 on the connector member 16. A gasket 30 provides an air tight seal with the valve body 48. The cap member 18 contains the closure valve 22 and it also contains a valve actuating means 34 in a cavity 36. The outer end of the sleeve 84 is enclosed by the balloon 24.

The balloon 24 is secured at its open end to the sleeve 84 by a coupling ring 94. For this purpose, the sleeve 84 is provided with a set of external annular bands of increasing diameter, namely 88a, 88b, 88c and 88d. The open end of the balloon 24 is seated against a radial shoulder 92 and the mouth portion is in close fitting engagement with the annular bands 88a, 88b, 88c and 88d. The coupling ring 94 is provided with a set of internal annular bands of increasing diameter, namely 94a, 94b, 94c and 94d. The annular bands on the coupling ring 92 are of larger diameter than the corresponding annular bands on the sleeve 84 by an amount just sufficient to accommodate the thickness of the wall of the balloon 24 which is disposed therebetween. The end face of the coupling sleeve 94 is seated against the radial shoulder 92 and is bonded thereto, preferably by ultrasonic welding. For this purpose, coupling ring 94 is preferably of the same material as the sleeve 84 and may be provided, in its initial form, with a small annular rib on the end surface for engagement with the shoulder 94 to facilitate the ultrasonic welding. This arrangement for securing the balloon 24 is advantageous in that the coupling ring 94 may be injection molded for high speed production and it also facilitates high speed assembly. Further, the coupling ring 94 provides good air tight sealing of the balloon and eliminates the problem of sharp edges, as experienced with a formed metal ring, which may cut the balloon.

It is noted that the balloon has a wall thickness which diminishes from its mouth to its central portion or dome. This configuration has the desirable result of allowing inflation to commence and the explosion to occur at the end of the balloon.

The closure valve 22 comprises a valve body 96 in the form of an inverted cup. The valve body 96, preferably constructed of plastic, fits within the sleeve 84 and is bonded thereto, as by ultrasonic welding, to form an air tight seal. The valve body 96 is seated at its lower end against a retainer 98 which in turn is seated on a radial shoulder in the sleeve 84. The closure valve 22 comprises a valve seat 102 which engages an internal radial shoulder 104 on the valve body. The valve seat 102 comprises an annular rim 106 and a set of spokes 108 which terminate at a central opening. The valve seat 102 is preferably constructed of a soft, pliable rubber or similar plastic material and is formed as a unitary structure. The valve body 96 defines an outlet port 100 which is surrounded by the valve seat 102. The closure valve 22 also comprises a movable valve element 112 which is normally held between the retainer 98 and the valve seat 102 with the closure valve open. The movable valve element 112 comprises a piston 114 with a tapered nose engaging the free ends of the spokes 108. It also comprises an annular flange 116 which rests on the retainer 98 and which is adapted to engage the annular rim 106 of the valve seat 102 when the valve element 112 is forced outwardly causing the piston 114 to extend through the spokes 108. The retainer 98 is provided with a central passage 118 and a set of small axial passages 122. A discharge passage thus extends from the outlet port 52 of the connector member 16 through the cap member 18 including port 126, cavity 36, passages 118 and 120 to outlet port 100.

The cap member 18 also contains the valve actuating means 34 which includes an actuating plunger 122 and a coil spring 134. The actuating plunger 122 has a stem 124 which extends through a port 126 in an end wall 132 and the sleeve 84. It also comprises an annular flange 128 which is adapted to engage the end wall 132 of the sleeve. The coil spring 134 has one end seated on the retainer 98 and the other end seated against the annular flange of the actuating plunger 122. The spring 134 exerts a bias force on the actuating plunger 122 for the purpose of establishing a threshhold value of pressure for the pressure sensing valve 20.

After the connector body 116 is screwed onto the valve stem, as described above, the cap member 18 is screwed onto the connector member 16. When the sleeve 84 is screwed onto the connector member 16 the gasket 30 forms an air tight seal between the end wall 132 of sleeve 84 and the valve body 48. At the same time, the stem 124 of the actuating plunger 122 engages the valve actuator 74 which is held in place by the pressurized air of the tire acting through the diaphragm 56. This causes the coil spring 134 to be compressed so that the parts are in the relative positions as shown in FIG. 2.

In use, the tire pressure warning device is installed on the tire valve stem after making sure that the tire is properly inflated. The connector member 16 and the cap member 18 are separated by unscrewing the sleeve 84 from the body 26. The connector member 16 is installed on the valve stem by screwing the threaded bore 28 onto the stem. This causes the valve opener 42 to open the tire valve and pressurized air from the tire is admitted to the valve chamber 44. This causes the annular rim 62 of the movable valve element 56 to be seated against the valve seat 54 thereby closing the pressure sensing valve 20 to prevent loss of air from the tire.

To complete the installation of the pressure warning device, the cap member 18 is mounted onto the connector member 16 by screwing the sleeve 84 onto the body 26. As the threads are progressively tightened, the stem 124 of the actuating plunger 122 engages the stem 76 of the valve actuator 74. The normal pressure of the tire acting through the diaphragm 58 applies a sufficient force to the valve actuator 74 so that it remains in place with its annular flange 78 abutting the end wall of the valve body 48. The progressive engagement of the actuating plunger 122 and valve actuator 74, however, causes the actuating plunger 122 to be pushed against the resistance of the coil spring 134 causing it to be compressed. When the cap member 18 is fully screwed onto the connector member 16, the coil spring 134 exerts a bias force through the actuating plunger 122 on the valve actuator 74 tending to open the movable valve element 56 of the sensing valve 20. This bias force is overbalanced by the force exerted on the movable valve element 56 by the pressurized air of the tire. Thus, the pressure sensing valve 20 is in a stable operating condition with the valve closed so long as the air pressure in the tire remains above a predetermined value.

In the event that the tire loses air pressure by reason of leakage, the force exerted on the movable valve element 56 will diminish. As the tire pressure progressively decreases, the force exerted on the valve actuator 74 by the movable valve element 56 progressively decreases. At a threshhold value of pressure, the force exerted by the valve actuator 74 will be equal and opposite to the bias force exerted by the actuating plunger 122. Any further decrease in the air pressure of the tire will result in a lesser force exerted by the valve actuator 74 than the bias force exerted by the actuating plunger 122 and consequently, the valve actuator 74 will be pushed against the diaphragm 58 by the coil spring 134. This allows the coil spring to elongate and thus the bias force exerted thereby is decreased until it becomes equal to the force exerted on the valve actuator 74 by the diaphragm 58. A predetermined increment of decrease in tire pressure from the threshhold value to a predetermined value will occur without opening the pressure sensing valve 20 because of the action of the diaphragm 58. During this increment of pressure change, the actuating plunger 122 is moved by the bias force of spring 134 and pushes the valve actuator 74 against the diaphragm 58 of the valve element 56. However, the annular rim 62 of the valve element 56 remains seated against the valve seat 54 so that the pressure sensing valve 20 remains closed. This obtains because the diaphragm 58 is distended by the valve actuator 74 and, throughout the increment of pressure decrease, the force on the diaphragm 58 is less than that required to lift the annular rim 62 from the valve seat 54. However, at the predetermined pressure value, the diaphragm 58 is sufficiently distended that the force exerted thereon by the valve actuator 74 overcomes the seating force on the valve element 56 exerted by the air pressure of the tire. Consequently, the annular rim 62 of the valve element is unseated from the valve seat 54 and the sensing valve 20 is opened.

It will be appreciated that the operation of the pressure sensing valve 20, as just described, will be the same for a slow leaking tire as for a fast leak or blow-out. The main difference is the time period during which the increment of pressure change occurs and concomitantly, the rate of movement of the actuating plunger 122 and valve actuator 74 against the diaphragm 58. It is noted that the diaphragm 58 of the movable valve element 56 serves as means for preventing opening of the sensing valve 20 until the tire pressure has decreased by the predetermined pressure increment between the threshhold and predetermined values of pressure. In serving this function, the diaphragm 58 is a lost motion device which couples the valve actuator 74 with the annular rim 62 of the valve element 56, i.e. the valve actuator 74 is allowed to move a predetermined distance before it causes movement of the annular rim 62. This valve operating means is especially important in the event of a slow leak in the tire. If, for example, the movable valve element 56 were a rigid structure, a slight pressure decrease below the threshhold value would allow the bias force of the spring 134 to slightly unseat the valve. This would result in a flow of pressurized air past the pressure sensing valve commencing when the threshhold value of pressure occurs, with the result that the balloon would be exploded prematurely, i.e. before the predetermined value occurs.

As described above, when there is loss of tire pressure and the pressure diminishes to the predetermined value, the pressure sensing valve 20 is opened. As a result, the pressurized air from the tire flows through the port 52 and the port 126 into the cavity 36 and thence through the central passage 118 and small passages 120 past the closure valve element 112 and through the outlet port 100 to the interior of the balloon 24. Consequently, the balloon 24 is inflated by the pressurized air from the tire until it ruptures, i.e. explodes with a loud audible report. When the balloon explodes, there is an outrush of air through the outlet port 100 and this air flow exerts a force on the closure valve element 112 causing it to overcome the resistance of spokes 108 and to be seated with its annular flange 116 against the annular rim 106 of the valve seat 102. Thus, the closure valve 122 is closed and prevents further escape of air from the tire through the outlet port 100. Thus, when the balloon explodes, the vehicle driver is warned that the tire pressure has decreased to an unsafe value; no further tire air is lost after the balloon explodes and the driver may take measures to attend to the tire.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. In a tire pressure warning device of the type comprising:
   a body adapted to be threaded onto the filler valve stem of a tire and to open the tire valve therein and admit pressurized air from the tire to an inlet passage in said body, a pressure sensing valve in fluid communication with said inlet passage, the pressurized air therein tending to close said sensing valve, actuating means acting on the sensing valve to open it when the pressure of the pressurized air is below a predetermined value whereby air from the tire is allowed to flow through the sensing valve to an outlet passage in said body, and alarm means in fluid communication with the the outlet passage and adapted to produce an alarm signal in response to flow of air through the sensing valve, the improvement wherein, said sensing valve comprises an annular valve seat and a valve element including a distendable resilient diaphragm peripherally bounded by an annular sealing rim adapted to engage said valve seat, said pressurized air exerting a force on said diaphragm and said sealing rim tending to close said valve, said actuating means exerting a resilient bias force on only a central portion of said diaphragm tending to distend said diaphragm and move said sealing rim away from said valve seat to thereby open said valve, whereby progressively decreasing values of said pressure from a threshold value causes said diaphragm to be progessively distended without opening said valve until said pressure decreases below a predetermined value.

2. The invention as defined in claim 1 wherein, said body comprises a connector member containing said pressure sensing valve and said inlet passage and being adapted to be screwed onto the valve stem of the tire, a tire valve opener in said connector member for opening the tire valve when said member is screwed onto the valve stem, said connector member defining a valve chamber communicating with said inlet passage and said outlet passage, said valve seat surrounding said outlet passage in said connector member, said valve element being disposed in said valve chamber, and a valve actuator engaging said diaphragm and disposed in said outlet passage and adapted to be engaged by said actuating means.

3. The invention as defined in claim 1 wherein, said alarm means is an explodable balloon adapted to explode when it is filled with pressurized air from the tire, and a closure valve in said outlet passage adapted to close the outlet passage after the balloon explodes.

4. The invention as defined in claim 3 wherein, said closure valve comprises a closure valve seat and a piston having an annular flange adapted to engage the closure valve seat, said closure valve seat comprising an annular member with radially inwardly extending spokes defining a central opening, said piston extending partially into the central opening against said spokes to retain the closure valve open, and being adapted to be forced by flow of pressurized tire air upon explosion of said balloon so that the annular flange engages the valve seat and closes the closure valve.

5. The invention as defined in claim 2 wherein, said body includes a cap member which is in threaded connection with said connector member and detachable therefrom, said actuating means being disposed in said cap member and including an actuating plunger in engagement with said valve actuator, and a coil spring biasing said actuating plunger toward engagement with said valve actuator tending to open said sensing valve.

6. The invention as defined in claim 5 wherein, said balloon closes the discharge passage of said closure valve.

7. The invention as defined in claim 3 wherein, said balloon has a wall thickness which diminshes from its mouth to its central portion.

* * * * *